United States Patent
Nelson (10) Patent No.: US 8,624,195 B2
(45) Date of Patent: Jan. 7, 2014

(54) NEUTRON DETECTOR ATTACHMENT DEVICE

(75) Inventor: Greg Nelson, Ithaca, NY (US)

(73) Assignee: Princeton Gamma-Tech Instruments Inc., Princeton, NJ (US)

( * ) Notice: Subject to any disclaimer, the term of this patent is extended or adjusted under 35 U.S.C. 154(b) by 115 days.

(21) Appl. No.: 13/418,514

(22) Filed: Mar. 13, 2012

(65) Prior Publication Data

US 2013/0240743 A1    Sep. 19, 2013

(51) Int. Cl.
  *G01T 3/08*  (2006.01)
(52) U.S. Cl.
  USPC .................................................. 250/370.05
(58) Field of Classification Search
  USPC ............... 250/370.01–370.15, 269.1–269.8,
                                  250/390.01–390.12
  See application file for complete search history.

(56) References Cited

U.S. PATENT DOCUMENTS

| | | | |
|---|---|---|---|
| 4,671,919 A * | 6/1987 | Gaussa et al. | 376/254 |
| 4,795,910 A | 1/1989 | Henderson et al. | |
| 5,659,177 A | 8/1997 | Schulte et al. | |
| 5,680,423 A | 10/1997 | Perkins | |
| 6,242,741 B1 | 6/2001 | Miller et al. | |
| 6,369,382 B1 | 4/2002 | Ito et al. | |
| 6,522,984 B1 | 2/2003 | Jordanov | |
| 6,590,206 B1 | 7/2003 | Evrard | |
| 6,707,047 B2 | 3/2004 | Craig et al. | |
| 6,727,505 B2 | 4/2004 | Benke et al. | |
| 6,765,978 B1 | 7/2004 | Kronenberg et al. | |
| 6,806,474 B2 | 10/2004 | McGregor et al. | |
| 6,895,089 B2 | 5/2005 | Wang et al. | |
| 6,928,130 B1 | 8/2005 | Kronenberg et al. | |
| 6,954,512 B1 | 10/2005 | Kronenberg et al. | |
| 6,989,541 B2 | 1/2006 | Penn | |
| 7,125,305 B2 | 10/2006 | Green et al. | |
| 7,498,964 B1 | 3/2009 | Beyerle | |
| 7,919,758 B2 | 4/2011 | Stephan et al. | |
| 7,994,482 B2 | 8/2011 | Frank | |
| 8,008,626 B2 | 8/2011 | Kub et al. | |
| 8,183,537 B1 | 5/2012 | Rhiger et al. | |
| 8,187,887 B2 | 5/2012 | Swager et al. | |
| 8,194,814 B2 | 6/2012 | Rowland et al. | |
| 8,445,861 B2 * | 5/2013 | Feller et al. | 250/391 |
| 2001/0014134 A1 * | 8/2001 | Kehayias | 376/159 |
| 2005/0094756 A1 | 5/2005 | Ronaldson et al. | |
| 2006/0023828 A1 | 2/2006 | McGregor et al. | |
| 2006/0043308 A1 | 3/2006 | McGregor et al. | |
| 2006/0056570 A1 | 3/2006 | McGregor et al. | |
| 2006/0056573 A1 | 3/2006 | McGregor et al. | |
| 2007/0114442 A1 | 5/2007 | Baltz et al. | |
| 2007/0132351 A1 | 6/2007 | Downing et al. | |
| 2009/0001280 A1 | 1/2009 | Kearfott | |

OTHER PUBLICATIONS

Jenkins, Ron et al., Quantitative X-ray Spectrometry, Marcel Dekker, New York, 1981.

(Continued)

*Primary Examiner* — Kiho Kim
(74) *Attorney, Agent, or Firm* — Gordon Stewart (57) ABSTRACT

An auxiliary neutron detector apparatus designed for attaching and supplementation to an existing gamma-ray spectrometer adds improved neutron detection capabilities. The apparatus uses the existing detector and so does not require additional detector materials, including $^3$He, which are required by conventional neutron detector attachments. Because of the cost and limited availability of detector materials, this invention is particularly valuable for upgrading systems without existing neutron detector, and for repairing systems with damaged neutron detectors.

29 Claims, 6 Drawing Sheets

(56) References Cited

OTHER PUBLICATIONS

Harms, J., Nuclear Instruments and Methods, 53 pp. 192-196, North-Holland Publishing Co., 1967.

M Kocsis, "The micro void neutron detector," Nuclear Instruments and Methods in Physics Research A, 529, pp. 354-357 (2004).

G. F. Knoll, T. M. Henderson, W. J. Felmlee, "A Novel 3He Scintillation Detector," IEEE Transactions on Nuclear Science NS-34 (1), pp. 470-474 (1987).

A. K. Drukier, J. Igalson, L. Sniadower, "A new detector of neutrons," Nuclear Instruments and Methods 154 (1), pp. 91-94 (1978).

F. D. Brooks, H. Klein, "Neutron spectrometry—historical review and present status," Nuclear Instruments and Methods in Physics Research A 476, pp. 1-11 (2002).

H. Toyokawa, et al, "A spherical neutron counter with an extended energy response for dosimetry," Radiation Protection Dosimetry 70 (1-4), pp. 365-370 (1997).

D.P. Hutchinson et al., "Large area combined neutron/gamma detector for homeland security" Detector/Sensor R&T Conf., Gatlinburg, TN, Sep. 14-16, 2004.

H. Ing et al. "ROSPEC—a simple reliable high resolution neutron spectrometer" Radiation Protection Dosimetry 70 [1-4], pp. 273-278 (1997).

Pellegrin et al., "A Multichannel Nanoparticle Scintillation Microdevice with Integrated Waveguides for Alpha, Beta, Gamma, X-Ray, and Neutron Detection", IEEE, MEMS 2006, Istanbul, Turkey, pp. 682-685, Jan. 22-26, 2006.

Silver et al., Optimization of a 6LiF bolometric neutron detector, 2002, Nuclear Insturuments and Methods in Physics Reasearch, 485, 615-123.

* cited by examiner

Figure 6

NEUTRON DETECTOR ATTACHMENT DEVICE

FIELD OF THE INVENTION

The invention relates generally to spectrometers and, more particularly, to a spectroscopic apparatus that digitizes an analog signal for processing for isotope identification. More specifically, the present invention comprises an auxiliary neutron detector, that may be deployed and attached to an existing gamma-ray spectrometer for isotope identification. These spectrometers are useful in the detection and processing of neutrons emitted from radioactive materials potentially used in terroristic or other surreptitious activity.

BACKGROUND OF THE INVENTION

Spectroscopy is the science of measuring radiation from a source. The measured input is comprised of a range of frequencies or wavelengths which are recorded and represented as a spectrum. Spectroscopy can involve different ranges of radiation including microwaves, visible and invisible light, X-rays, or gamma rays, as well as other types of signals. In nuclear spectroscopy, the X-rays and gamma rays are frequently used to identify the presence of specific radioactive materials; this information is useful in determining both the type (natural, benign, threatening) and quantity (safe level, level of concern, health threat) of the material present.

Neutron radiation is another form of radiation, normally produced by the breakdown of atomic nuclei in fission, or by various neutron generation methods. When identifying radioactive materials, the presence of neutrons provides a critical factor in detecting and discriminating certain isotopes, particularly special nuclear materials (SNM). Neutron energies may be measured spectroscopically, but while there are many applications for this, isotope identification normally relies on simple neutron detection and counting, rather than spectroscopy.

Neutron detection is used in national security (e.g. protection against nuclear terrorism), scientific research (e.g. neutron scattering for materials research), health physics (e.g. monitoring and control of personnel exposure at nuclear power plants), and other applications. Neutron detector requirements vary according to the application and specific intended use and can range from simple counting to detecting the presence of a neutron source and providing information about its identity and location. In general, most neutron detectors do not perform in an optimal way for their intended use and the performance of most neutron detectors is well below that of theoretical limits. An example of this is the type of neutron detector used in radiation portal monitors.

Ideally, one would want to detect 100% of the neutrons emitted by a neutron source present in the object being scanned (e.g. a vehicle or cargo container) as this would maximize the likelihood of the portal monitor determining that the source was present. For neutron detection, most portal monitors use a neutron detector that consists of one or more $^3$He proportional counters embedded in a blanket of neutron moderator material (e.g. high-density polyethylene, or HDPE). For most current systems, a fast neutron (e.g. energy between 100 keV and 20 MeV) entering the surface of the device orthogonally has a probability of being captured and detected in the $^3$He counter of between 15 and 20%. Not only would one want to know whether or not a source is present, but ideally one would also like to know what type of source it is (e.g. potentially threatening or not), how big it is, it's location, etc.

There are many devices known in the art which are capable of gamma-ray spectroscopy, but which do not have neutron detection capabilities. In addition, other systems have been installed with neutron detection capabilities, but because gas proportional detectors may gradually degrade through the loss of gas, particularly those utilizing $^3$He because of its high diffusion rate, spectrometers have often degraded or are inoperable due to failed neutron detectors which are in need of repair. The spectrometer apparatus apart from the neutron detector portion may still be operational and due to the considerable expense and value of these devices, it is not something to be casually discarded and thrown away due to the breakdown of the neutron detector. Thus, there is a clear need for a method and apparatus that can add or restore neutron detection abilities using existing spectrometer equipment.

It is well known that $^3$He proportional counters have been the favored technology for most large area systems (including area and portal monitors) in most situations where the presence of neutrons is the critical measurement, and where the energy and direction of the neutron source is less critical. This form of detector can be made very sensitive (by increasing pressure), fairly large (by building large tubes), and is very immune to false positives from high gamma exposure ("gamma crosstalk"). Unfortunately, because of the high diffusion rate of helium gas, especially under high differential pressure, these detectors tend to fail over extended periods of time and require refurbishment or replacement.

In recent years, $^3$He stocks have been rapidly depleted due to the combined effects of the upsurge in demand after the terrorist attacks of Sep. 11, 2001, the Helium Privatization Act of 1996, and the diminishing number of tritium-bearing warheads being disassembled (tritium may be used to produce $^3$He). As a result, it is becoming more and more difficult to repair and service existing systems using $^3$He neutron detectors. In this context, the disclosed invention provides an attachment that can measure neutrons without relying on $^3$He, using only detectors that are already part of installed equipment plus a small amount of electronics. This provides the user with a unique, inexpensive solution to a common problem—how to repair an existing monitoring system without expensive or unavailable $^3$He.

A great deal of research and development has been expended over the years in the pursuit of improved neutron detectors and many different detection methods have been investigated. Although current devices are far more sophisticated and have much better performance than their predecessors of several decades ago, few solutions exist which are fully commercialized. Even those that have been commercialized are technically complex by comparison to $^3$He, and most suffer from issues regarding gamma crosstalk as described above. The most widely deployed at this time are Li-based scintillators (which require complex discrimination to eliminate gamma crosstalk) and $BF_3$ tubes, which are considered so hazardous that most customers reject them.

Traditionally, neutron detectors have been arranged in a generally cylindrical geometry with a central detecting element such as a gas proportional tube or a bundle of fiber optic scintillators, surrounded by a generally annular body of neutron moderating material. Alternatively, devices have been constructed in a generally planar geometry with the detecting element disposed behind a plate of moderating material. In some instances, several layers of planar neutron detecting elements have been sandwiched in moderator; although this represents an improvement over the previous cases, it is not ideal.

U.S. Pat. No. 4,795,910 to Henderson et. al. teaches a radiation-detection/scintillation composite comprising a scintillation matrix that is responsive to the absorption of atomic particles for the release of light energy. A solid phase that is separate therefrom consists of a multiplicity of particulate carriers which contain target nuclei suspended within the matrix which have an index of refraction to light energy which closely matches that of the matrix. The carriers comprise hollow spherical glass shells internally containing heavy helium ($^3$He) target nuclei in a gas phase. The carriers are responsive when subjected to radiation which is then absorbed resulting in the release of the energetic particles which can be measured and plotted.

U.S. Pat. No. 5,659,177 to Schulte et. al. discloses and claims a thermal neutron detector with directional capability based on gadolinium (Gd, a rare-earth element) foils for thermal neutron capture (leading to electron emission) that is placed next to a number of segmented silicon semi-conductor detectors. Multiple layers are used so that the layer closest to a neutron source will produce a higher neutron count rate than one further away from it, due to the further layer being shielded by the closer layer. Schulte describes how the use of multiple sets of panels pointed in different directions can provide full directional coverage.

U.S. Pat. No. 5,680,423 to Perkins et. al. teaches a scintillator for detecting neutrons comprised of optical fibers consisting of $SiO_2$, a thermal neutron capturing substance and a scintillating material in a reduced atmosphere. The fibers are contained in an anoxic atmosphere and are coated with a polymer. Photons generated by interaction with thermal neutrons are trapped within the coated fibers and are directed to photoelectric converters. A measurable electronic signal is generated for each thermal neutron interaction within the fiber. These electronic signals are then manipulated, stored, and interpreted by normal methods to infer the quality and quantity of incident radiation.

U.S. Pat. No. 6,895,089 to Wang teaches a signal splitting methology applied specifically to digital subscriber lines (xDSL). This filter comprises a specific combination of low-pass and high-pass elements, shunt elements, and specific resistor, capacitor, and inductor values that provide appropriate impedance matched inputs and outputs for both DSL and basic wireline telecommunication connection (POTS) equipment to be served on the same incoming subscriber line.

U.S. Pat. No. 6,989,541 to Penn teaches a neutron detector consisting of a neutron counter and a plurality of optical fibers peripherally arrayed around the counter. The optical fibers have a layer of scintillator material deposited on them whereby an incidental fast neutron can transfer kinetic energy to nuclei in one or more of the optical fibers to produce recoil protons. The recoil protons interact with the coating to produce scintillation light that is channeled along the optical fiber or fibers with which the neutron interacted. The slowed neutron passes into the neutron counter where the neutron effects generation of a signal coincident with the light produced in the optical fibers in which the neutron deposited energy Finally, U.S. Pat. No. 7,919,758 to Stephan et. al. discloses and claims a neutron detector device comprising a neutron moderating material that is divided into four sections within a container, each of the four groups of neutron detecting elements disposed at a substantially different distance from the containers' outside surface so that each of the groups is separated from the outside surface of the container by a substantially different density of said moderating material. At least two of the four groups of detecting elements may be independently addressable, and each said independently addressable group has a substantially different detection response for neutrons entering said moderating material from said outside surface.

In each of the prior art descriptions and claimed inventions regarding neutron detectors, a special material or special detector configuration is required at the initial sensor intake to achieve neutron detection capabilities. In Wang '089, a signal splitter for a specific application is disclosed, but the claimed design focuses on separating the two components of the input signal and is not applicable to passing the same signal to multiple systems with minimum distortion. Nowhere in the prior art is there any teaching or suggestion of a separate neutron measurement device that can be connected to an existing gamma-ray detector so as to receive and process the signal originally destined for the gamma-ray signal path and, without significant distortion, duplicate this signal for neutron-activation analysis.

SUMMARY OF THE INVENTION

The present invention provides an approach to neutron detection that allows the collection of both gamma and neutron signals from the same detector. By applying principles of neutron activation, gamma-detectors can be made responsive to neutrons interacting with either surrounding materials or the detector material itself. When the detection device of the present invention is connected to an existing gamma-ray detector, it can receive the signal originally destined for the gamma-ray signal path and, without significant distortion, duplicate this signal for neutron-activation analysis.

DETAILED DESCRIPTION OF THE DRAWINGS

DETAILED DESCRIPTION OF THE INVENTION

Conventional gamma ray spectroscopy systems are comprised of a high voltage source that provides power to a means for detecting gamma rays emitted from a particular source of radiation. A gamma ray emitted from a source of nuclear decay is converted by the detector into an electrical analog pulse signal connected thereto. The analog pulse signal is typically first amplified in a pre-amplifier and then subsequently shaped in a shaping amplifier and stretched in a pulse stretcher. After the analog pulse signal is amplified, shaped, and stretched, it is converted into a digital signal by an analog to digital converter. The analog to digital converter (ADC) outputs an n-bit digital signal (e.g., a 12-bit digital signal) that represents the energy of the detected gamma ray. This is then counted in a binning scheme to produce a histogram, i.e. an energy spectrum of the incoming gamma rays.

The development of high-speed and high-performance analog-to-digital converters, i.e., the digital spectrometer changes this order: the analog pulse signal is typically amplified in a preamplifier, and then immediately digitized by an ADC. Then, a signal processing step combines amplification, shaping, and stretching, which is performed in the digital domain by multiplying, summing, or applying other mathematical transforms to the digital signal produced by the ADC. This yields a digital signal which is counted in a binning scheme to produce a histogram.

When connected to a radioisotope identification system, the detection device of the present invention extracts a portion of an existing signal from a gamma-ray detector through a high-impedance input, and amplifies this signal. The amplified signal is then processed spectroscopically to filter out known signals from gamma emitters, with the residual signal representing neutron events. This signal can be exported as a spectrum, as a count rate, or as a simple digital signal. The digital signal in particular, can take the place of a neutron detector discriminator output in an existing system.

In one embodiment, the present invention comprises an improved neutron detector device that may be used to upgrade or repair the neutron unit path for an existing radioisotope identification system.

In another embodiment, the present invention may be regarded as novel neutron detector that may be incorporated in the design of a new radioisotope spectroscopic identification system.

The present invention will now be described more fully hereinafter with reference to the accompanying drawings, in which preferred or other embodiments of the invention are also shown. No embodiment described below should be understood as limiting any invention as recited in the claims and any claimed invention may cover processes or apparatuses that are not specifically described below. The claimed inventions are not to be limited to any one device having all the features of any one apparatus shown or process described or to any feature(s) common to a number of or multiple devices described below. It is also possible that part of an apparatus or process described below is not an embodiment of any claimed invention.

Figure 1:
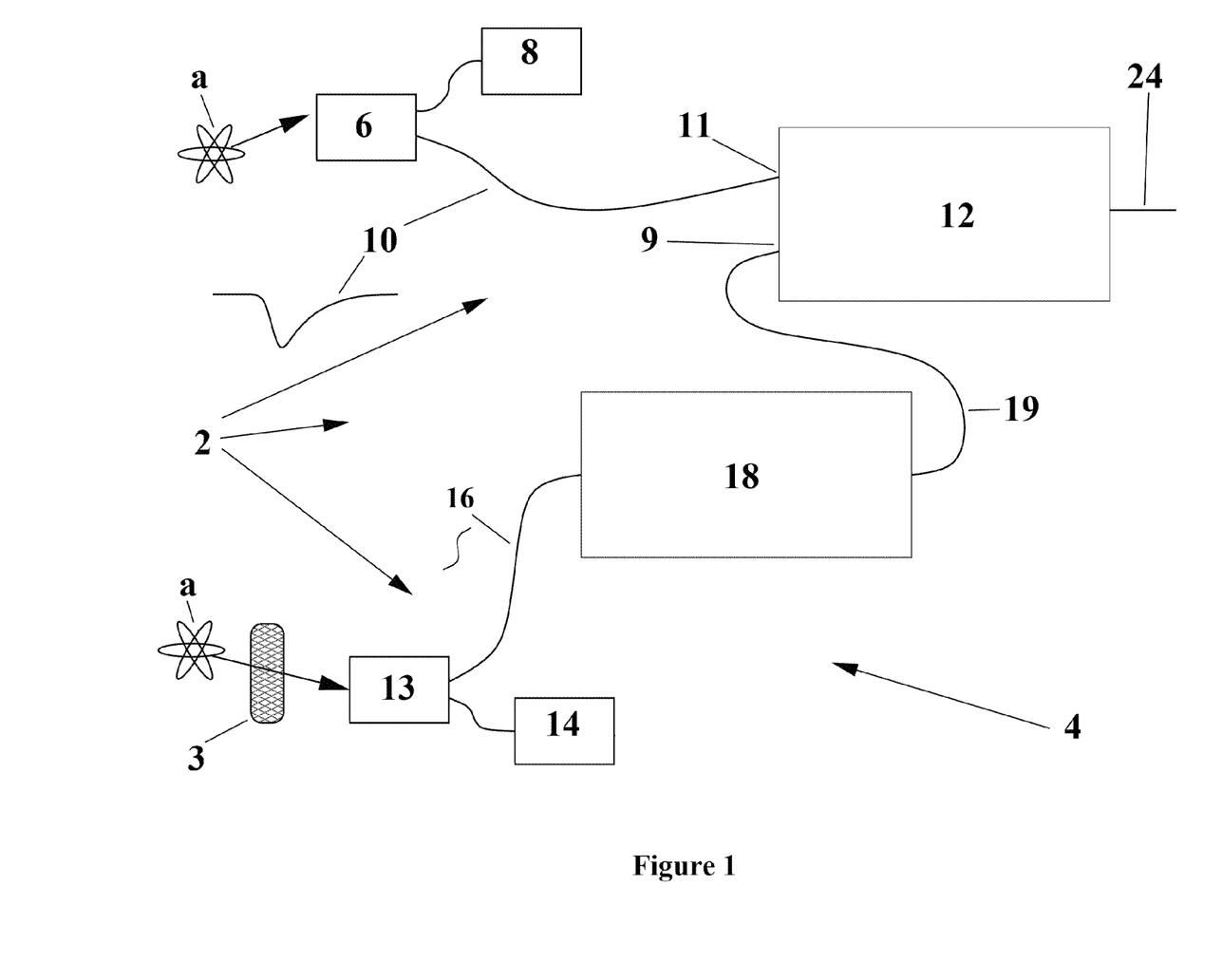
FIG. 1 is a schematic diagram of a prior art gamma and neutron radioisotope identification system.

Referring now to FIG. 1, an example of a spectrometer known in the art is shown 2 that may be deployed for isotope identification of a radioactive source. The device shown includes a neutron counter 4 and a gamma ray detector 6, which may be a scintillator device, a solid-state detector, or another comparable measurement device. Detector 6 is powered by a high voltage supply 8. The analog signal 10 generated from this detector is forwarded to the gamma input 11 of spectrometer 12. Known detector devices used for measuring gamma rays in nuclear spectroscopy systems include: Geiger-Muller tubes, sodium iodide scintillation detectors, plastic scintillators, silicon (lithium) detectors, gas flow proportional counters, germanium (lithium) detectors and hyperpure germanium (HPGe) detectors. In the practice of the present invention, commonly deployed, spectroscopic detectors are suitable, including scintillators and the HPGe.

Parallel with this path is a neutron detector 13 which may be a gas proportional detector comprised of $^3$He, $BF_3$, or boron-lined, a scintillator comprised of a lithium iodide, lithium doped glass, or an organic liquid semi-conductor. The neutron detector 13 that is known in the art requires its own high voltage supply 14. This neutron detector also creates an analog signal 16 that is processed by an auxiliary neutron channel 18. The neutron count output 19 is routed to the main spectrometer component 12 and the two signals are processed together to create the final output 24.

Figure 2:
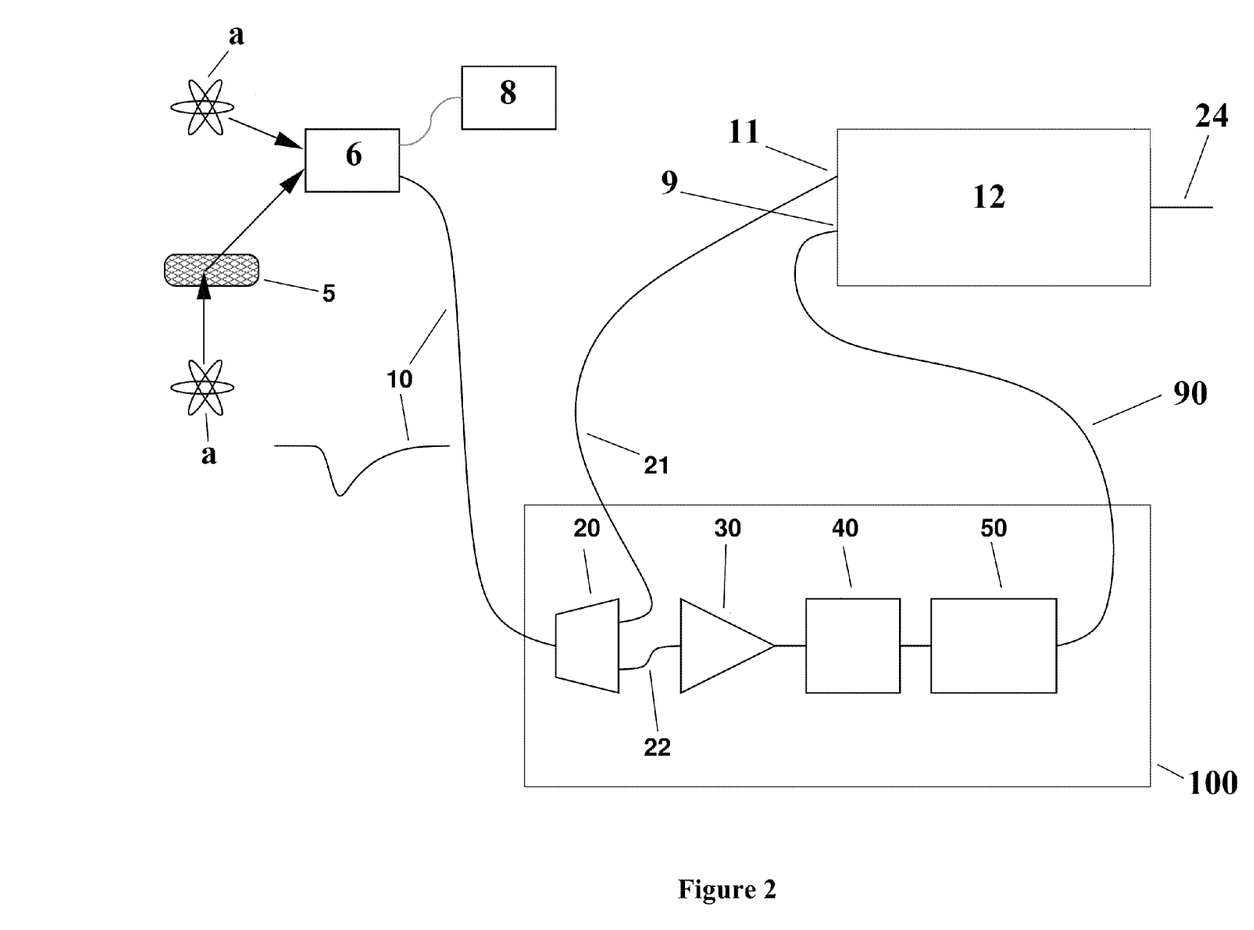
FIG. 2 is a block diagram of an electronic circuit embodiment of a gamma spectroscopy system with attached neutron detection circuitry in accordance with the invention.
Figure 3:
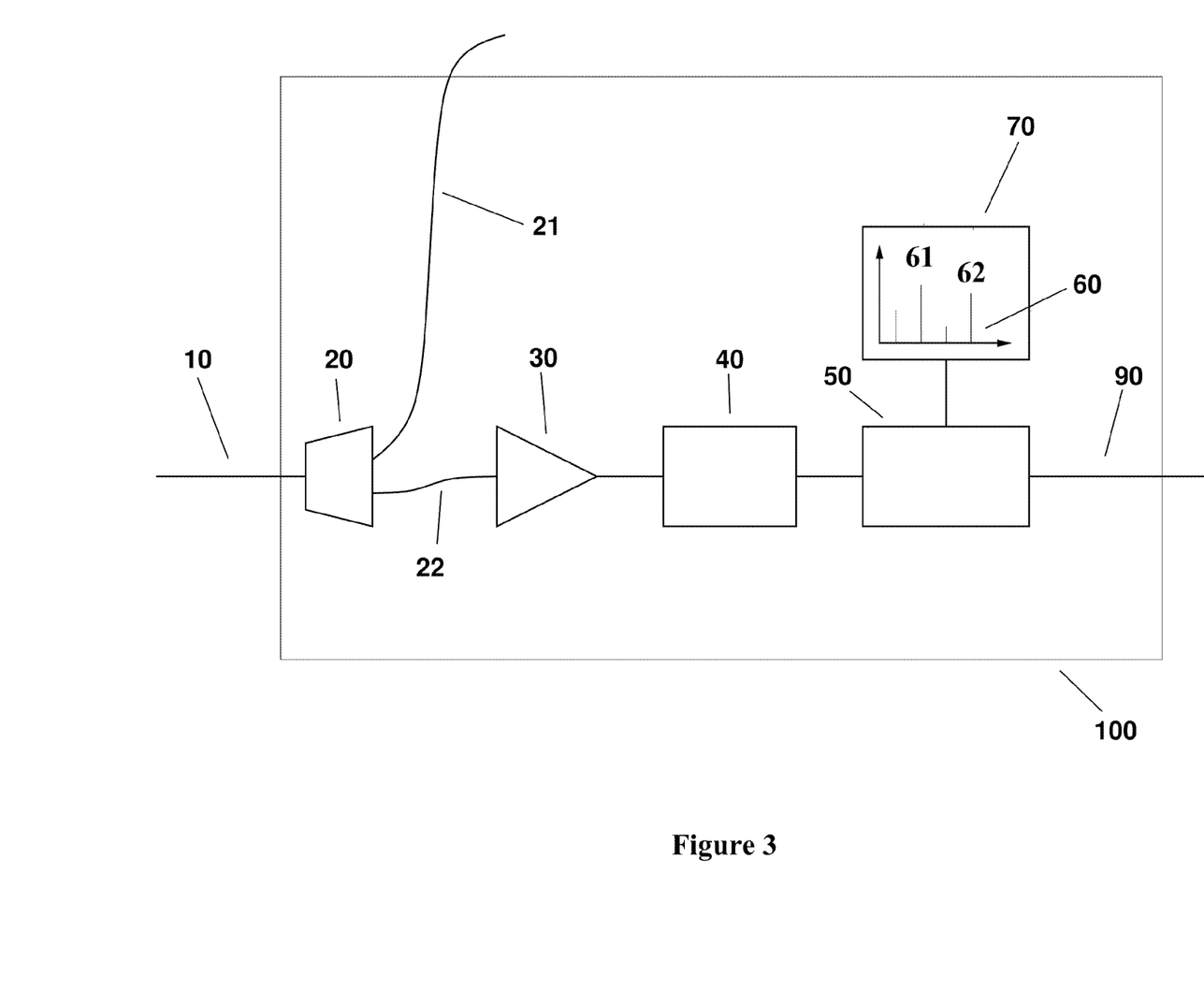
FIG. 3 is a detailed block diagram representing the signal processing functions of the attached neutron detection circuitry.
Figure 4:
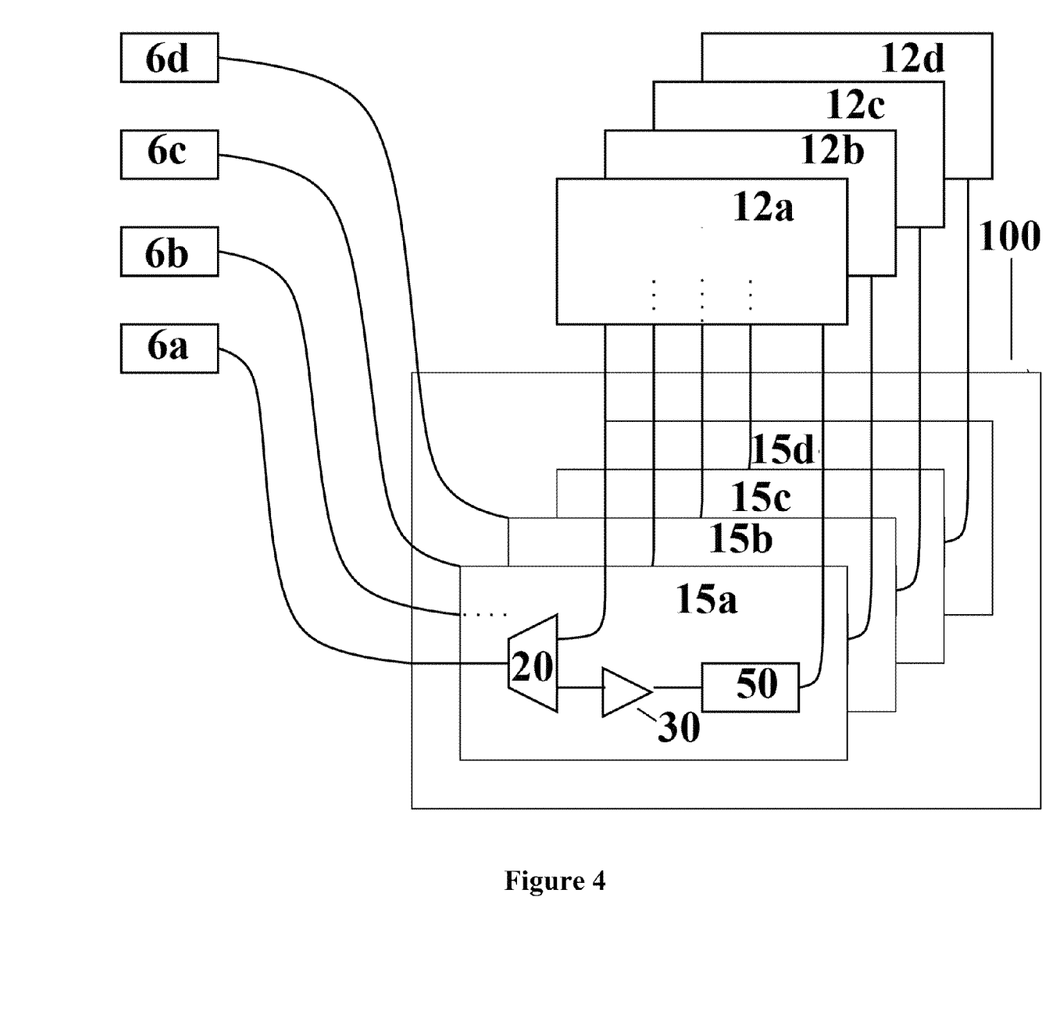
FIG. 4 is a detailed block diagram of the invention adapted to a multi-detector spectrometer system.

Referring now to FIGS. 2 and 3, two of the novel neutron detector devices of the present invention are shown in block diagram. FIG. 2 shows the neutron detector operably-connected to a complete spectrometer unit. FIG. 3 shows the details of the detector device by itself. In both designs and for the purposes of this disclosure and the claims that follow, the invention is not limited to the incorporation and use of a particular type or make of splitter 20, a particular type or make of amplifier 30, a particular type or make of analog-to-digital converter (ADC 40), a particular type of digital processor 50, a particular type of memory 70, or a particular form of output 90. In addition, a variation of these two basic designs as depicted in FIGS. 2 and 3 is shown in FIG. 4 which implements multiple neutron detection circuits. Scintillator detectors (6) useful in the device and practice of the present invention are made by companies like Saint-Gobain Ceramics and Plastics Inc., Paris France, (http://www.detectors-.saint-gobain.com/) and Amcrys, Kharkov, Ukraine. (http://www.amcrys.com/products/scintillators/naitl). Suitable amplifier devices useful in the practice of the present invention are commercially available from Analog Devices Inc., Norwood, Mass., (Model Nos. AD743; OP27) or Linear Technologies Inc., Milpitas, Calif. (Model Nos., LT1885, LT6233/4/5).

Figure 5:
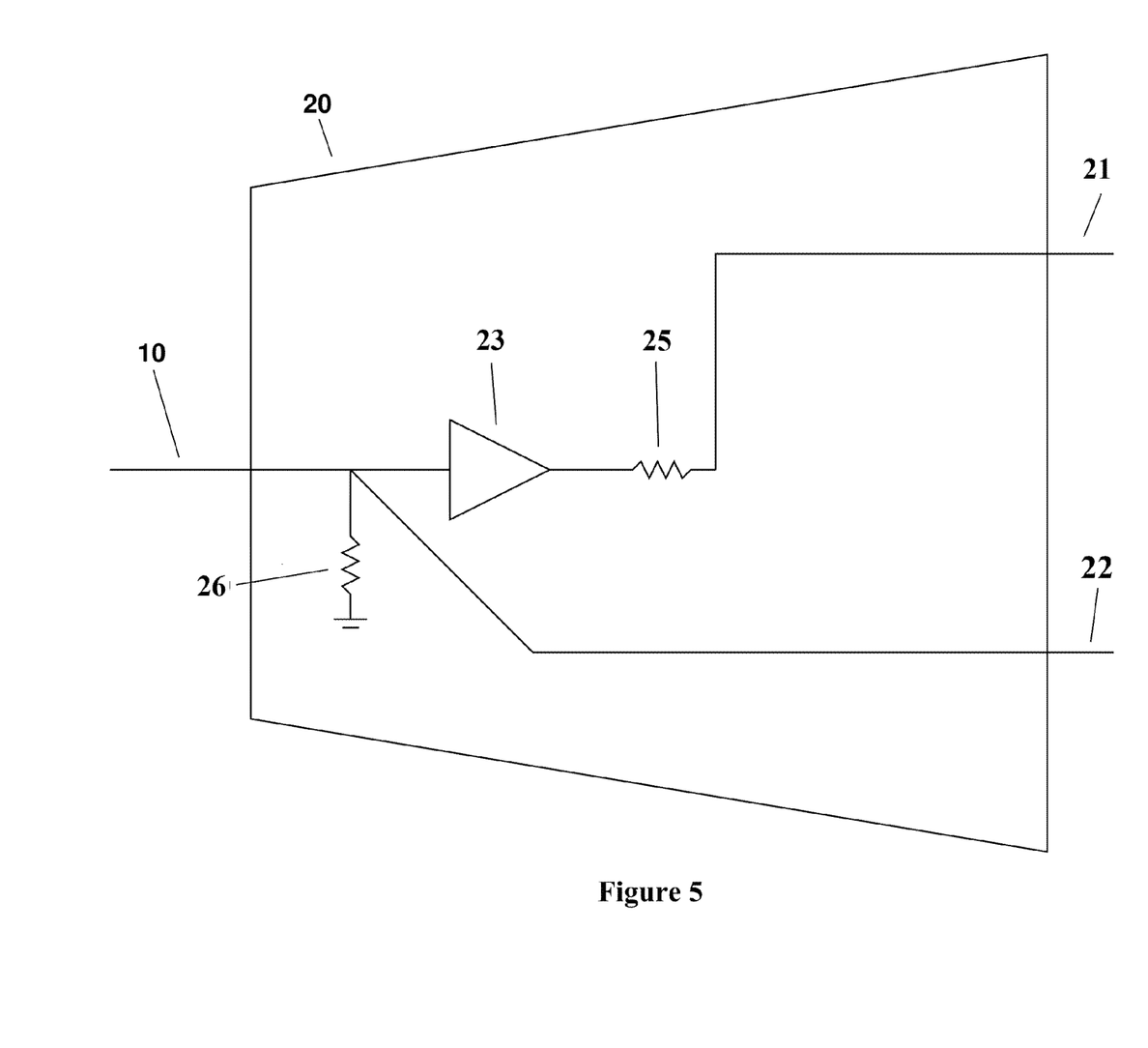
FIG. 5 is a detailed block diagram of an active splitter design that may be used in a second embodiment of the invention.

Referring specifically now to FIG. 2, the neutron attachment 100 of the present invention is shown generally in the context of a prior-art gamma spectroscopy system to which it is attached. The prior-art spectrometer 12 (which may be referred to as the "host spectrometer") is connected the neutron attachment so as to receive input from it. Similar to those known in the prior art, detector device 6 absorbs gamma rays which are produced by either a radioactive gamma emitter source "a" or by the neutron activation of material therein by a neutron emitter 5. In the case of neutron activation, the incoming neutrons from the emitter source "a" interacts with the composition in emitter material 5 and is temporarily absorbed by the material. The activated material then returns to a "non-activated" state by the emission of a gamma ray. As a result, both the gamma emitter "a" and the material in the neutron emitter 5 produce gamma rays that are detected by the gamma detector 6. A high voltage power source 8 activates the detector 6 which, when bombarded by the gamma-rays from the radioactive source "a" or the neutron-activated gamma rays from material 5, produces an analog output signal 10 which is divided into two parts by a splitter 20. Splitter 20 may be comprised of an active signal-splitting approach (described later with respect to FIG. 5); or it may be comprised of a passive signal-splitting approach (described later with respect to FIG. 6).

In each case, a gamma-output signal 21 is returned directly to the host spectrometer 12 and a separate neutron output signal 22 is channeled to the high-impedance input neutron amplifier 30. Although the signal 22 and amplifier 30 are referred to as "neutron" signals, they represent neutron-activated gamma events that are detected by detector 6. The term "neutron" distinguishes the portion of the signal used by the device of the present invention from the "gamma" portion of the signal returned to the host spectrometer. After the analog pulse signal 22 is amplified, shaped, and stretched by the amplifier 30, it is converted into a digital signal by an analog to digital converter (ADC) 40. The analog to digital converter (ADC) creates an n-bit digital signal (e.g., a 12-bit digital signal) which represents the energy of the detected gamma ray. Suitable analog-to-digital converters useful in the practice of the present invention are commercially available from Analog Devices Inc., Norwood, Mass., (Model No. AD9245) or Linear Technologies Inc., Milpitas, Calif. (Model No. LTC2248).

A standard processor 50 takes the energy measurements from the ADC 40 and performs analytical processing using data memory firmware (not shown) containing a histogram 60, (detailed further in FIG. 3) to produce a neutron output 90. This output returns to the main or host spectrometer 12 and provides a neutron input. In the preferred embodiment of the present invention, this signal processing block is implemented as a field-programmable gate array (FPGA). However, the scope of the present invention may also incorporate a commercial digital signal processor (CDSP) or a custom-fabricated application-specific integrated circuit (ASIC) instead. Preferably, the present invention comprises an FPGA because of its' increased flexibility for implementing a wide range of signal processing algorithms. Typical commercially available FPGAs include products from Xilinx, Inc., San Jose, Calif. (Model Nos. XC3S100, XC4VFX12, & XC6VLX75), and Altera Inc., San Jose, Calif. (Model No. EP3C5U256I7N). DSP implementations could be based on components commercially available from Analog Devices Inc., Norwood, Mass., (Model No. ADSP-21479), or Texas Instruments, Dallas, Tex., (Model No. TMS320C674x Referring again to FIG. 2, the present invention may also comprise a "gamma re-emission" material 5 that has an adequate neutron capture cross-section and distinctive neutron-activation gamma spectrum. The gamma re-emission material is comprised of elements selected from the group consisting of boron (B), lithium (Li), chlorine (Cl), manganese (Mn), iron (Fe), nitrogen (N), and mixtures thereof. However, this material may be omitted if other materials present (including the material of the gamma detector) provides a sufficient degree of neutron-activation.

The signal processing element performed by the neutron attachment is shown in greater detail in FIG. 3. The embodiment of the invention shown here also comprises the signal splitter 20, an amplifier 30, an analog-to-digital-converter (ADC) 40, a digital processor 50, data memory firmware 70 containing a histogram 60, and a neutron output channel 90 from the processor.

As briefly alluded to above, splitter 20 may be comprised of a "passive" or "active" signal-splitting approach. Either signal-splitting approach produces an externally channeled signal 21, which is fed back to the host spectrometer 12 (not shown), and an internal signal 22. The active signal-splitting approach is the schematic depicted in FIG. 5 wherein the preferred embodiment of the splitter 20 is an "active" splitter. Here the analog signal input 10 is terminated in a resistor 26. The signal 10 is driven and transmitted with characteristic impedance which must match the input impedance for maximum signal fidelity (e.g. the resistance of resistor 26 should be 50 ohms if the input cable is a 50 ohm cable). This terminated signal portion 10 may be tapped and sent to output 22 (neutron analog out) because the high input impedance of the connected component (amplifier 30 in FIG. 3) does not significantly affect the impedance matching. The remaining analog input component is channeled to a second buffer amplifier 23 (which also has a high input impedance, as well as low noise characteristics) that then duplicates the input signal, through a series of impedance-matching resistors 25, to the gamma analog output 21. Generally, the impedance of resistors 25 and 26 will match; however, if not, it is possible to correct for impedance mismatches between detector 6 and spectrometer 12 (see FIG. 2) by selecting different values if necessary. (E.g. the input impedance could be set to 50 ohms while the output impedance is set to 75 ohms.)

Figure 6:
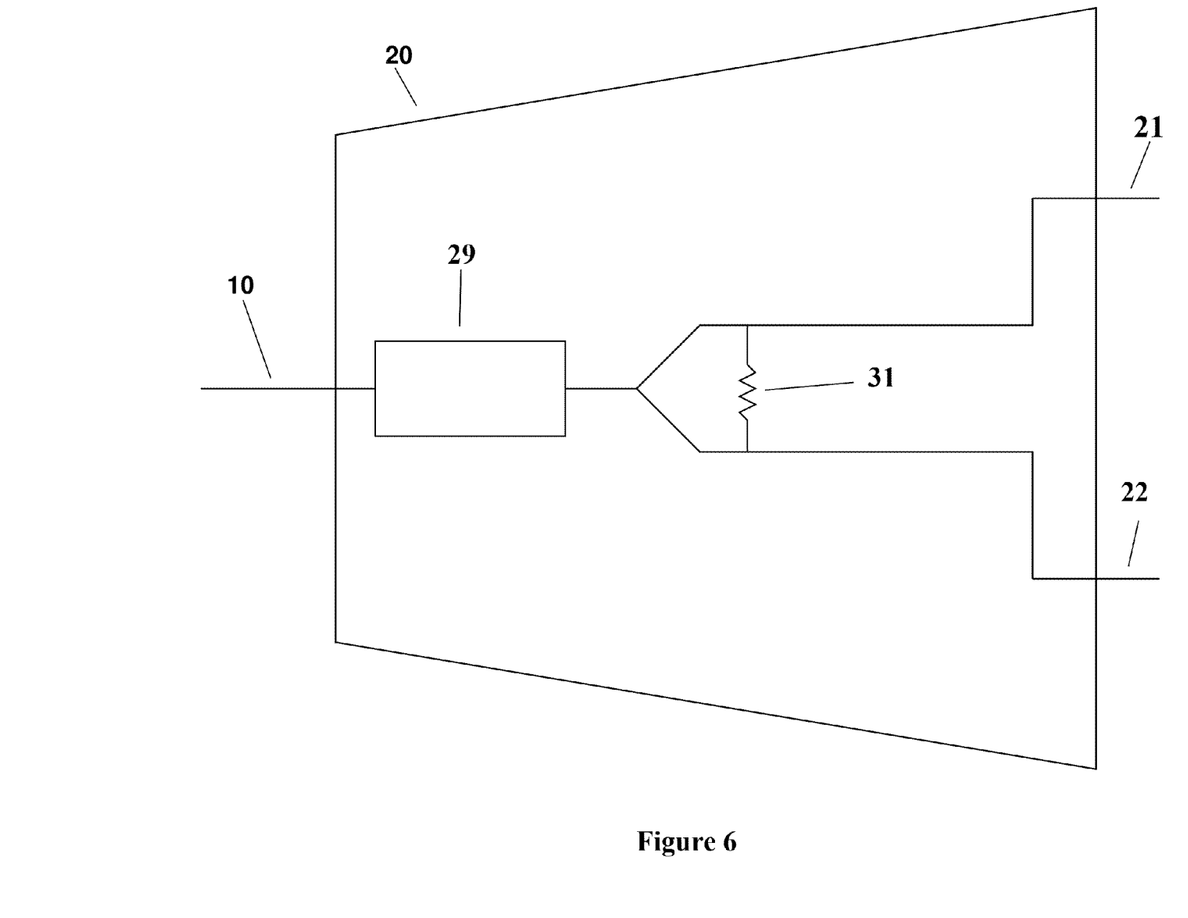
FIG. 6 is a detailed block diagram of a passive splitter design that may be used in a third embodiment of the invention.

Referring now to FIG. 6, an alternate embodiment of the novel neutron detector device of the present invention comprises a "passive" splitter 20. The analog signal input 10 from the detector 6 is directed to a matching transformer 29. The input impedance of the matching transformer is designed to match the impedance of signal 10. The output impedance of transformer 29 is typically ½ of the input impedance, making it possible to connect to two independent outputs (21 and 22) with impedance equal to the input impedance. An additional resistor 31 is used to minimize crosstalk between the two outputs. This embodiment injects minimal noise, but there are insertion losses for splitting the signal this way, and the bandpass characteristics of the transformer 23 must be very carefully considered. In an alternate embodiment of the passive splitter, a simple junction may be inserted between the input 10 and outputs 21 and 22. This is not shown here as it is a simplification of FIG. 6, through the removal of transformer 29 and resistor 31.

Referring again back to FIG. 3, regardless of the type of splitter 20 used, the neutron amplifier 30 processes the input signal 22 so as to create a signal of larger amplitude. This signal is digitized by an analog-to-digital converter (ADC) 40. In an analog pulse-processing system, filtering and pulse shaping is also performed by the amplifier 30. In a digital pulse-processing system, the amplifier simply increases the signal amplitude, and the shaping and filtering steps are done in the signal processor 50. In either case, the processor 50 receives a pulse train as a series of digital values proportional to the input gamma energies. These are used to create a histogram 60 that is stored in data memory banks 70. Analysis of the histogram separates gamma events 61 from neutron events 62. The neutron events can then be sent to the output 90, either as a numerical value, a count rate, or a pulse train.

In a preferred embodiment of the present invention, the detector 6 (as shown in FIG. 2) measures the events from the radioactive source "a" and is designed for attachment to input 11 of an existing gamma-ray spectrometer 12. The detector 6 is not a component of the invention, but consists essentially of a scintillator with an attached photo-multiplier or photodiode. It may also consist of a hyper-pure germanium (HPGe) crystal with associated pre-amplifier. In the preferred embodiment of the present invention, this connection in the pre-existing equipment is replace by a connection from detector 6 to signal splitter 20, and a connection from signal splitter output 21 to input 11.

The signal splitter 20 is directly connected to a first-stage operational amplifier 30. Part of the split analog signal 22 then is sent to amplifier 30 that is incorporated within the neutron processor of the present invention 100, while the remainder of the signal 21 then (with minimal distortion) passes from the splitter 20 back to analog input 11 of the original spectrometer 12. The amplifier 30 presents a high input impedance to minimize signal distortion. This may comprise a junction gate field-effect transistor (JFET) input or a complementary metal-oxide semi-conductor (CMOS) input. Suitable amplifier devices useful in this embodiment of the present invention are commercially available from Analog Devices Inc., Norwood, Mass., (Model Nos. AD743; OP27) or Linear Technologies Inc., Milpitas, Calif. (Model Nos., LT1885, LT6233/4/5).

Once through the amplifier 30, the ADC (40) converts an input analog voltage or current to a digital number that is proportional to the magnitude of the voltage or current. The first step is usually to convert the signal from an analog to a digital form by sampling and then digitizing it which turns the analog signal into a stream of numbers. The digital output is then sent to the processor 50. The digital output may use different coding schemes. Typically the digital output will be a two's complement binary number that is proportional to the input, but there are other possibilities. An encoder, for example, might output an unsigned binary value or a Gray code.

Referring again to FIG. 3, the processor 50 may comprise one or more of a number of different signal processor devices known in the art such as a field-programmable gate-array (FPGA), a commercial digital signal processor (CDSP), an application-specific integrated circuit (ASIC), or a general purpose microprocessor or microcontroller (CPU/MCU). The processor 50 creates a representation such as a spectral histogram 60 stored in memory 70, wherein the internal representation is a plurality of counts representing two or more energy bands.

The histogram 60 must then be processed in order to isolate the neutron-related events. This processor performs the necessary isolation of the neutron related events using energy discrimination. Low-energy gamma events (below 3 MeV) are typically associated with decay gammas. High-energy gamma events (3 MeV-8 MeV, or even as high as 10 MeV) are typically associated with neutron-activated prompt gammas. In this processing, the neutron counts are corrected for background count rates and for gamma/neutron crosstalk. In this way, sufficient isolation of the neutron related events is done entirely within the present invention. The spectrometer 12 to which the invention is attached continues to see only the low energy gamma counts typically associated with decaying gamma particles.

The neutron output 90 is a means for sending the neutron signal out to another system, such as the host spectrometer. The output shall consist essentially of one or more of a wide variety of data interconnection standards including Ethernet (IEEE 802 including all variations) EIA-232 (serial port), EIA-422, EIA-485, Universal Serial Bus (USB), serial peripheral interface (SPI), or a logic-level output (CMOS or TTL). SPI is often implemented directly in CPU or FPGA components and so may be produced directly from the same components implementing processor 50. Other protocols may require additional components. As examples: EIA-232 may be produced with a transceiver chip such as MAX3232CPWR from Texas Instruments (Dallas, Tex.).

The output that indicates the neutron-related events is preferably a digital pulse train, with each pulse representing a neutron event. This method is particularly applicable where an existing digital neutron count input will receive the output. In an alternate embodiment, the output is a neutron count rate, reported digitally through output 90. In another alternate embodiment, the output is a spectrum containing neutron counts, reported digitally through output 90.

Referring now to FIG. 4, in another embodiment of the present invention, a single "multi-channel neutron attachment" 110 may comprise a plurality of channels (shown symbolically here with 4 channels, although this invention is not limited to a specific number of channels). Each channel is functionally equivalent to the neutron attachment 100 shown in FIG. 3, but the combination of multiple channels may make a more compact and cost-effective device.

The multi-channel neutron attachment 110 can measure and analyze a plurality of input signals and is thereby designed for attachment to a number "N" of existing gamma-ray spectrometers. The attachment 110 comprises:
  i) A number ("N") of signal splitters 20;
  ii) "N" high-input-impedance amplifiers 30 each receiving one of the signals (22) from a corresponding signal splitter 20;
  iii) one or more analog-to-digital converters (50) for digitizing the outputs of the "N" amplifiers into digital samples;
  iv) a processing element for converting the digital samples into N internal representations of the corresponding signals, and for converting the N internal representations into neutron outputs; and
  v) one or more physical neutron outputs for connection to other systems (not shown)

The neutron counter attachment device may also be constructed with a number ("N") of distinct neutron pulse outputs corresponding to the N input signals, plus one pulse output corresponding to the aggregate of all the input signals.

The present invention also comprises a novel method for separately counting and processing neutron events in conjunction with and that of an existing "host" gamma-ray spectrometer comprising the steps of:
  i) splitting the analog gamma-ray source signal from a detector;
  ii) returning part of the split signal to the host spectrometer;
  iii) passing the other part of the split signal to an amplifier;
  iv) processing the analog detector signal with the amplifier;
  v) digitizing the amplified signal with an analog-to-digital converter to produce a set of digital samples;
  vi) processing the digital samples to isolate the neutron-related events;
  vii) creating an output that indicates the neutron-related events.

The step of processing the analog detector signal with the amplifier may also include pulse shaping. However, optionally, the step of processing the digital samples may instead provide the pulse shaping.

What is claimed is:

1. A detector device to process neutron events from a radioactive source designed for attachment to an existing gamma-ray spectrometer, comprising:
  i) a signal splitter;
  ii) a high-input-impedance amplifier receiving one of the outputs of the signal splitter;
  iii) an analog-to-digital converter for digitizing the amplifier output into digital samples;
  iv) a processing element for converting the digital samples into an internal representation of the signal, and for subsequently converting the internal representation into a neutron output; and
  v) a physical neutron output for connection to another system.

2. The device of claim 1 wherein the signal splitter is an active signal splitter, comprising an input impedance-matching termination resistor, an amplifier, and an output impedance-matching resistor.

3. The device of claim 2 wherein the high-impedance amplifier is an operational amplifier with a JFET (junction gate field effect transistor) input.

4. The device of claim 3 wherein the amplifier performs pulse shaping and filtering.

5. The device of claim 3 wherein the amplifier performs minimal filtering, and wherein the processing element for converting the digital samples into an internal representation performs pulse shaping and filtering.

6. The device of claim 5 wherein the processing element comprises one or more of the following elements: ASICs (application-specific integrated circuits); FPGAs (programmable gate-arrays); DSPs (digital signal processors) and CPUs/MCUs (general purpose microprocessors or microcontrollers).

7. The device of claim 6 wherein the internal representation is a spectral histogram.

8. The device of claim 7 wherein the physical neutron output is a TTL (transistor-transistor logic) or CMOS (complementary metal-oxide-semiconductor) pulse that is triggered once for each neutron detected.

9. The device of claim 7 wherein the physical neutron output is a communication port selected from the group comprising an EIA-232, IEEE-802, serial peripheral interface (SPI), and a universal serial bus (USB), which is used to transmit the neutron information to another system.

10. The device of claim 9 wherein the neutron information is in the form of a count rate.

11. The device of claim 9 wherein the neutron information is in the form of a spectrum.

12. The device of claim 6 wherein the internal representation is a plurality of counts representing two or more energy bands.

13. The device of claim 1 wherein the signal splitter is a passive signal splitter, comprising an impedance matching transformer and a crosstalk reduction resistor.

14. The device of claim 1 wherein the signal splitter is a simple junction between the input and the output signals, relying on the high-input-impedance amplifier to minimize distortion.

15. The device of claim 1, further comprising a gamma re-emission material that improves the neutron-activation gamma response of the pre-existing gamma detector by providing a volume with a high neutron-capture cross section and good energy characteristics of the re-emitted gammas.

16. The device of claim 15 wherein the re-emission material comprises elements selected from the group consisting of boron (B), lithium (Li), chlorine (Cl), manganese (Mn), iron (Fe), nitrogen (N), and mixtures thereof.

17. An device to process neutron events, designed for attachment to a plurality of "N" existing gamma-ray spectrometers, comprising: i) N signal splitters; ii) N high-input-impedance amplifiers each receiving a signal from one of a corresponding signal splitters; iii) one or more analog-to-digital converters for digitizing the outputs of the N amplifiers into digital samples; iv) a processing element for converting the digital samples into N internal representations of the corresponding signals; and for subsequently converting the N internal representations into neutron outputs; and v) one or more physical neutron outputs for connection to other systems.

18. The device of claim 17 wherein there are N distinct neutron pulse outputs corresponding to the N input signals, plus one pulse output corresponding to the aggregate of all the input signals.

19. A method of augmenting a gamma-ray spectrometer to process neutron events comprising the steps of:

i) splitting the analog gamma-ray source signal from a detector;
ii) returning part of the split signal to the original gamma spectrometer;
iii) passing the other part of the split signal to an amplifier;
iv) processing the analog detector signal with the amplifier;
v) digitizing the amplified signal with an analog-to-digital converter to produce a set of digital samples;
vi) processing the digital samples to isolate the neutron-related events;
vii) creating an output that indicates the neutron-related events.

20. The method of claim 19 wherein the step of processing the analog detector signal with the amplifier includes pulse shaping.

21. The method of claim 19 wherein the step of processing the analog detector signal with the amplifier does not include pulse shaping, and wherein the step of processing the digital samples instead provides the pulse shaping.

22. The method of claim 21 wherein the isolation of the neutron related events is done with energy discrimination, separating low energy gamma counts typically associated with decay gammas from high energy gammas typically associated with neutron-activated prompt gammas.

23. The method of claim 22 wherein the neutron counts are corrected for background count rates and for gamma/neutron crosstalk.

24. The method of claim 23 wherein the isolation of the neutron related events is done with spectroscopy.

25. The method of claim 24 wherein the spectroscopy is applied to identifying known conventional gamma emitters and subtracting their spectral contributions, retaining the residual counts for further processing to select neutron events.

26. The method of claim 25 wherein the spectroscopy is applied to identifying known neutron-activation gamma lines, and processing those lines to identify neutron events.

27. The method of claim 26 wherein the output that indicates the neutron-related events is a digital pulse train, with each pulse representing a neutron event. This method is particularly applicable where an existing digital neutron count input will receive the output.

28. The method of claim 26 wherein the output is a neutron count rate, reported digitally through a communication protocol.

29. The method of claim 26 wherein the output is a neutron event spectrum, recording the energies of the neutron-capture gamma events, reported digitally through a communication protocol or stored in memory.

* * * * *